United States Patent [19]
Gilbert et al.

[11] 4,174,330
[45] * Nov. 13, 1979

[54] PROCESS FOR DISPERSING ADDITIVES IN THERMOPLASTIC POLYMERS

[75] Inventors: Ronald E. Gilbert, Katy; Thomas J. Lynch, Houston; Robert J. Rowatt, Orange, all of Tex.

[73] Assignee: Gulf Oil Corporation, Pittsburgh, Pa.

[*] Notice: The portion of the term of this patent subsequent to Jun. 19, 1996, has been disclaimed.

[21] Appl. No.: 907,531

[22] Filed: May 19, 1978

Related U.S. Application Data

[63] Continuation-in-part of Ser. No. 835,269, Sep. 21, 1977, abandoned.

[51] Int. Cl.² ............................................ C08L 91/00
[52] U.S. Cl. .......................... 260/28.5 A; 260/23 H; 260/32.6 PQ; 260/42.21
[58] Field of Search ............... 260/28.5 A, 32.6 PQ, 260/42.21, 23 H

[56] References Cited

U.S. PATENT DOCUMENTS

| | | | |
|---|---|---|---|
| 3,401,169 | 9/1968 | Mills | 260/28.5 A |
| 4,039,507 | 8/1977 | Paige et al. | 260/28.5 A |
| 4,116,911 | 9/1978 | Miyahara et al. | 260/28.5 A |

Primary Examiner—Melvyn I. Marquis
Attorney, Agent, or Firm—Richard L. Kelly

[57] ABSTRACT

An improved process is provided for incorporating additives into thermoplastic polymers. The desired additive(s) are dispersed in a continuous solid phase which is a mixture of a wax and a normally liquid hydrocarbon to form a Bingham fluid composition. These Bingham fluid compositions, while solid at ambient temperature and pressure, will flow under an applied pressure and can be pumped to feed the additive to a molten polymer. When this mixture is passed through a mixing apparatus such as an extruder, the additive is uniformly dispersed throughout the polymer. The process is particularly well suited to incorporate additives into a molten ethylene polymer either as, or immediately after, the molten ethylene polymer is discharged from the reaction zone in which the polymer is prepared.

16 Claims, 2 Drawing Figures

PROCESS FOR DISPERSING ADDITIVES IN THERMOPLASTIC POLYMERS

CROSS REFERENCE TO RELATED APPLICATIONS

This application is a continuation-in-part of our earlier-filed application Ser. No. 835,269 filed on Sept. 21, 1977, now abandoned.

The copending application of Thomas J. Lynch and Robert J. Rowatt Ser. No. 907,445, filed on May 19, 1978, which is a continuation in part of earlier application Ser. No. 838,776, filed on Oct. 3, 1977, now abandoned discloses the Bingham fluid compositions employed in the process of this invention. This application and the present application are assigned to a common assignee.

BACKGROUND OF THE INVENTION

In the manufacture and sale of thermoplastic polymers, it is customary to introduce various additives into the polymer before such polymers are sold or used. Specifically, such additives are incorporated to stabilize the polymer against oxidation, deterioration from exposure to ultraviolet light, or to modify the tendency of films prepared from such polymers to stick to each other or "block." Many of the additives employed for this purpose are finely-divided solids. Polymers containing such additives frequently are referred to as compounded polymers.

The incorporation of additives into thermoplastic polymers presents greater difficulties than would be expected upon first consideration. This results from the fact that most additives are employed in low concentrations. In addition, many additives, particularly finely-divided solids, are not readily "wetted" and dispersed by highly viscous molten polymers. To overcome and/or minimize such problems, the art frequently uses master-batching techniques in which high levels of additives are incorporated into a polymer, which then is blended with additional "virgin" polymer to prepared compounded polymers having the desired concentration of the additive. The technique is used only out of necessity as it adds to the cost of preparing the desired compounded polymers. In addition, masterbatching introduces into the finished polymer an aliquot of polymer having an undesirably long heat history which adversely modifies certain polymer properties.

Certain thermoplastic polymers, particularly low density ethylene polymers and styrene polymers prepared by continuous mass polymerization processes, are discharged from the polymerization reaction zone in a molten state. The art has long recognized that the cost of manufacturing such polymers having additives dispersed therein could be reduced significantly if the desired additive(s) could be incorporated into the molten polymer, either as, or immediately after, the molten polymer is discharged from the polymerization zone. To date, the art has not developed satisfactory methods for incorporating additive(s) into such molten polymers at this point of their manufacture.

In view of the situations discussed above, there is a need in the art for developing an improved method for incorporating additive(s) into thermoplastic polymers.

SUMMARY OF THE INVENTION

The applicants have discovered that additives* can be readily dispersed into molten thermoplastic polymers by incorporating the desired additive(s) into a specific type of Bingham fluid**, admixing the Bingham fluid composition with the thermoplastic polymer, and comalaxating said mixture. The Bingham fluid employed for this purpose is a mixture of a wax and a liquid hydrocarbon. The Bingham fluid compositions can be pumped directly into the molten polymer in an extruder or like mixing apparatus. In the special case of ethylene polymers prepared by a continuous mass process, the Bingham fluid composition containing the additive(s) is incorporated into the molten polymer either as, or immediately after, the molten ethylene polymer is discharged from the reaction zone in which it is prepared.

*For the purpose of the present invention, the term "additive" is employed to define any material incorporated into a thermoplastic polymer to modify one or more of the polymer's properties.

**A Bingham fluid, sometimes referred to as a Bingham body, is a material which is a solid at a particular temperature under consideration, usually ambient temperature, but which will flow when subjected to an applied shearing stress which exceeds a minimum value characteristic of the system under consideration. For a description of the characteristics of Bingham fluids, see RHEOLOGY by Frederick Eirich, Academic Press Inc., New York City, Library of Congress Catalog Card 56-11131, particularly Volume 3, pages 198-201.

DETAILED DESCRIPTION OF THE INVENTION

Figure 1:
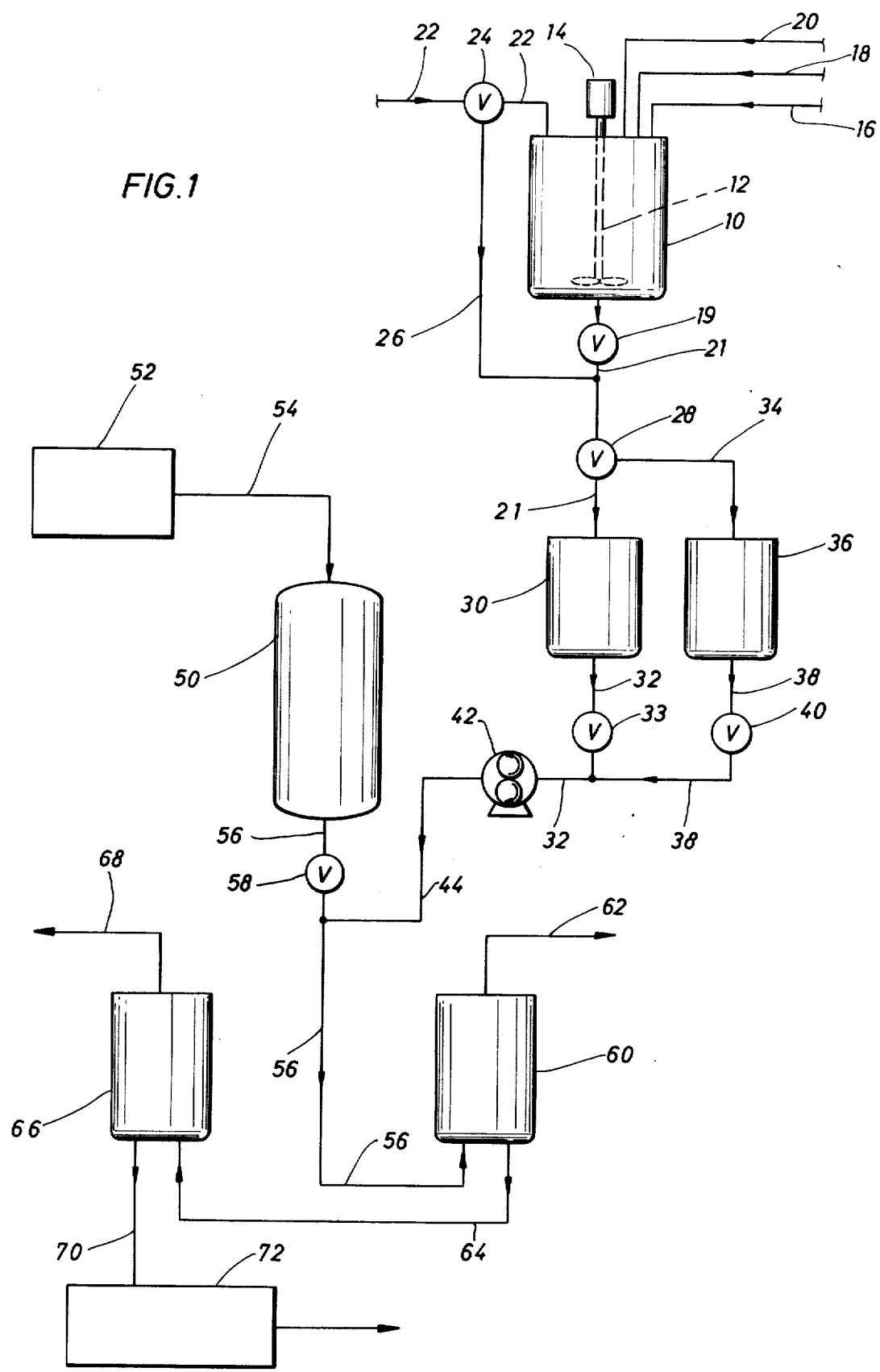
FIG. 1 is a schematic representation of one form of apparatus which can be employed to carry out the process of the invention in which an additive is incorporated into a molten ethylene polymer immediately after it is discharged from a polymerization reactor.

The continuous solid phase* of the Bingham fluid compositions of the invention consists of an intimate mixture of 100 parts by weight of a suitable wax and about 40–250 parts and preferably about 80–150 parts by weight of a liquid hydrocarbon. In special cases subsequently discussed, the wax and the liquid hydrocarbon can be employed in proportions outside of these ratios.

*The continuous solid phase customarily serves merely as a carrier for the functional material. In special cases subsequently described, one or both components of the continuous solid phase can play a functional role.

The continuous solid phase of the Bingham fluid compositions of the invention, in most instances, is not a true solid in a classical chemical and physical sense. Rather, it is a network of extremely finely-divided wax particles dispersed throughout the liquid hydrocarbon. In many instances the wax particles may be bonded to each other in a semi-crystalline lattice. In certain physical characteristics, the continuous solid phase resembles a gel. Regardless of its precise chemical and/or physical state, for the purpose of describing and claiming the invention, the wax-liquid hydrocarbon mixtures will be characterized simply as a "continuous solid phase."

The wax component included in the Bingham fluid compositions of the present invention can be any of the known waxes, provided that it meets each of the following criteria:

1. At least 30 parts of the wax will be dissolved in 100 parts of n-heptane at 80° C.
2. A solution prepared per (1) above, when cooled to 20° C., forms a continuous solid phase having the characteristics described earlier herein.
3. The continuous solid phase prepared per (2) above will flow when subjected to a shear stress of 50 sec$^{-1}$.

Suitable waxes are described in the *Kirk-Othner Encyclopedia of Chemical Technology*, Interscience Publishers, New York City, Second Edition, Library of Congress Card 63-1438, Vol. 22, pages 156-173, which description is incorporated herein by reference. Such waxes include the (a) animal waxes, e.g., bees wax, spermaceti wax, Chinese insect wax and shellac wax; (b) vegetable waxes, e.g., carnauba wax, candelilla wax, hydrogenated castor oil, ouricury wax, Japan wax, and bayberry wax; (c) mineral waxes, e.g., peat wax, montan wax, ozocerite wax, and petroleum waxes; and (d) synthetic waxes such as low molecular weight polyethylenes (which frequently are partially oxidized) and oxidized hydrocarbon waxes prepared from Fischer-Tropsch paraffins. The animal and vegetable waxes, while complex mixtures, are principally esters of a long chain fatty alcohol and a long chain fatty acid, although certain of the natural waxes also contain significant quantities of monoglycerides of long chain fatty acids such as glyceryl monostearate.

The preferred waxes for use in Bingham fluid compositions that are stored and used at ambient temperature, i.e., about 10° to 40° C., are the hydrocarbon waxes such as the petroleum waxes. Such hydrocarbon waxes are preferred by reason of their chemical inertness and their commercial availability in large volume at modest cost.

The petroleum waxes employed can be any one of the three principal categories of the petroleum waxes more specifically a paraffin wax, an intermediate wax, or a microcrystalline wax. As is recognized in the art paraffin waxes are predominately normal paraffins, straight chain saturated hydrocarbons which may contain minor amounts of isoparaffins. The microcrystalline waxes are predominately cyclid saturated hydrocarbons (naphthenes) and isoparaffins. The intermediate waxes are blends or mixtures of paraffin and microcrystalline waxes. Table I below sets forth certain of the physical and chemical properties of these three classes of waxes.

TABLE I

|  | Paraffin | Intermediate | Microcrystalline |
|---|---|---|---|
| Melting Point Range, ASTM D126° F. | 120–160 | 120–160 | 120–180 |
| Molecular Weight Range | 340–400 | 360–550 | 500–600 |
| Density Range | 0.80–0.917 | 0.85–0.93 | 0.89–0.94 |
| Gravity ASTM D287 °API, 210° F. | 35–60 | 30–55 | 30–50 |
| Distillation, Vacuum Corrected to 760 mm Hg 5% point, °F. | 750–810 | 825–900 | 950–1,050 |

A typical paraffin wax has the following properties:

| Gravity ASTM D287 °API | 41.3 |
|---|---|
| Melting point ASTM D87 °F. | 140.1 |
| Congealing point ASTM D938 °F. | 138.0 |
| Penetration ASTM D1321 at 77° F. | 14.0 |
| at 100° F. | 40.0 |
| Flash point, °F. | 455.0 |
| Ultraviolet absorbitivity at 280m ASTM D2008 | 0.01 |
| Iodine number | 0.4 |
| Molecular weight | 442.0 |
| Refractive index | 1.4359 |
| Distillation vacuum corrected to 760 mm. Hg 5% point, °F. | 804.0 |

It is known that certain of the petroleum waxes, depending upon their source, contain minor quantities of chemicals containing nitrogen, oxygen and/or sulfur atoms. Such minor components are difficult to remove. If such components are objectionable, equivalent hydrocarbon waxes can be prepared by synthetic methods, as by hydrogenating synthetic higher mono-1-olefins, particularly the $C_{18}$ to $C_{30}$ monoolefins. Alternatively, such mono-1-olefins themselves can be employed as the wax.

The liquid hydrocarbon included in the Bingham fluid compositions can be any of the common hydrocarbons of either the aliphatic or aromatic type. It is preferred to employ relatively low boiling aliphatic hydrocarbons, particularly the pentanes, hexanes, heptanes, and octanes.

The wax and the liquid hydrocarbon, when heated to a temperature sufficiently high to melt the wax and subsequently cooled to ambient temperature, provide thick mobile, single phase wax-like solids.* These blends, while solid at ambient temperature and pressure, flow readily under modest pressures of less than about 100 psig.**

*Since the continuous phase consists of a blend of two hydrocarbons, the transition between the solid state and the liquid state is not sharp. For the purpose of this invention, the continuous phase is considered to be a solid if it has the capability of holding finely-divided dispersed solids in suspension without significant settling for a period of 30 days at ambient temperature.

**A few isolated solids such as extremely fine silicas prepared by the burning of organosilicon compounds cause these Bingham fluids to gel. Such compositions flow only under higher pressures.

The precise physical characteristics of the wax-liquid hydrocarbon solid blends will depend somewhat upon the chemical type and the boiling point of the liquid hydrocarbon, and the chemical type and melting point of wax employed. The ratio of the two components also has an effect upon the physical properties of the resultant blends. It has been observed, however, that by proper selection of the wax and the liquid hydrocarbon, and the proportions of the two components, it is possible to prepare compositions that are homogeneous at ambient temperature and will retain their single phase solid state over the normal range of ambient temperature encountered in the temperate zone, specifically from about 10° C. to about 40° C. Compositions of optimum properties are obtained when a hydrocarbon wax having a melting point in the range of about 60°–80° C. is blended with a $C_5$–$C_{10}$ aliphatic hydrocarbon, with about 80 to 150 parts of liquid hydrocarbon being employed per 100 parts of the hydrocarbon wax. In special cases, the additive dispersed in the continuous solid phase can have an effect on the physical properties of the continuous solid phase. This phenomenon will be discussed subsequently.

The continuous solid phases of the Bingham fluids described above, by reason of being based on a hydrocarbon that is a liquid at ambient temperature, are solids at ambient temperature and atmospheric pressure. If the Bingham fluids are to be employed at subambient temperatures and/or stored at pressures above atmospheric, it is possible to employ in the continuous solid phase lower boiling hydrocarbons such as butane, propane, propylene, or ethylene. These lower boiling hydrocarbons, for the limited purpose of the present invention, are considered to be liquid hydrocarbons.

It will be recognized, of course, that such systems must be maintained at temperatures and pressures below the critical point of the liquid hydrocarbon included in the Bingham fluid composition. The critical point for ethylene is 9.9° C. and 50.5 atmospheres. The use of ethylene as the liquid hydrocarbon is desirable where it is desired to hold the introduction of extraneous compounds into the polymer to an absolute minimum.

Where a Bingham fluid composition is employed containing a liquid hydrocarbon of the type described in the second paragraph above and is stored at a temperature below 10° C., it is feasible and usually desirable to employ as the wax an aliphatic hydrocarbon which is a liquid at the critical temperature of the liquid hydrocarbon, but which is a wax-like solid at the temperature at which the Bingham fluid is to be stored. $C_{15}$ or lower aliphatic hydrocarbon can be employed, with $C_{10}$ to $C_{15}$ aliphatic hydrocarbons being preferred. Mixtures of ethylene and dodecane or tetradecane may be used with advantage as the continuous solid phase of such Bingham compositions.

The type of additive included in the Bingham fluid compositions of the invention will depend upon the ultimate purpose for which the compositions are to be used. Typical additives employed included colorants, antiblock agents, slip agents, antistatic agents, cling agents, and other additives customarily used in thermoplastic polymers and reported in the literature. One example of such additives includes silica materials, particularly diatomaceous earth, which are incorporated into polymers to reduce the tendencies of polymer films prepared therefrom to adhere to each other, or "block." Such materials frequently are referred to as "antiblock" agents. A second example of such additives includes various materials such as carbon black, titanium dioxide, and other pigments and dyes which are employed to color polymers. A third example of such additives includes various materials such as hindered phenols, organophosphites, and the like which are incorporated into polymers to function as antioxidants, stabilizers, and the like. A fourth example of such additives includes so-called slip agents such as the long chain fatty acid amides, particularly oleamide and erucamide. A fifth example of such additives includes antistat agents such as glyceryl monooleate, glyceryl monostearate, and the like. Another example of such additives includes $C_{20}$ to $C_{40}$ hydrocarbons which sometimes are included in olefin polymers as cling additives.

It will be recognized that certain additives may serve two or more functions when incorporated into certain polymer systems of interest. By way of example, carbon black can be employed in ethylene polymers as a colorant. It also serves as a light stabilizer or sunscreen. Titanium dioxide serves a similar dual function when incorporated into propylene polymers.

In selected special cases, the additive included in the Bingham fluid composition may serve as a partial or complete replacement for either the wax or liquid hydrocarbon included in the continuous solid phase of the Bingham fluid composition. As earlier noted, glyceryl monoesters of higher fatty acids such as oleic acid and stearic acid are waxes. Thus, a binary mixture of glyceryl monooleate (or glyceryl monostearate) and hexane can be employed to inject the glyceryl ester into a molten ethylene or propylene polymer to function as an antistat agent, or as a cling additive.

Certain inorganic solids when employed in admixture with liquid hydrocarbons function as Bingham fluids. When such solids are included in the compositions of the invention, they can function as a partial replacement for the wax. Examples of such materials include titanium dioxide, carbon black and some, but not all, siliceous materials. The siliceous materials that can serve as a partial replacement for the wax. Examples of such materials include titanium dioxide, carbon black and some, but not all, siliceous materials. The siliceous materials that can serve as a partial replacement for the wax contain hydroxyl groups and can be considered to be polymeric materials containing the grouping

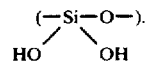

Typical examples of such siliceous materials include the products sold under the trade designation Cabosils*. Some natural occurring siliceous materials such as certain grades of diatomaceous earth function similarly. Siliceous materials consisting essentially of $SiO_2$ are inert and cannot serve as a partial replacement for the wax.

*Trademark of Cabot Corporation.

The method of the invention is particularly useful in introducing solid additives into thermoplastic polymers. Where solid materials are to be employed as the additive, they preferably should have a relatively small particle size, with the majority of the particles being a size such that at least 50% of the solids will pass through a 50-mesh screen (U.S. Standard).

The physical state of the Bingham fluid compositions will be determined by the nature of the additive included therein. When the additive is a solid which is not soluble in the continuous solid phase, the final composition will consist of a uniform dispersion of the solid additive in the inert continuous solid phase. When the additive is a liquid not soluble in the inert continuous solid phase, the final composition will consist of a uniform dispersion of the liquid additive in the inert continuous solid phase. When the additive is soluble in the inert continuous solid phase, the final composition will be a homogeneous solid having the additive dissolved herein.

The percentage of the additive to be dispersed in the Bingham fluid compositions of the invention can be varied over a wide range and normally will be set to facilitate the incorporation of the appropriate quantity of the additive into the molten polymer by pumping the Bingham fluid composition therein. Customarily, the additive will be dispersed in the Bingham fluid compositions in the range of about 1–60 weight %, preferably about 1–40 weight %, and especially about 5–20 weight % of the total composition. It is apparent that the invention provides great flexibility in metering either high or low concentrations of a desired additive into a polymer of interest, with the further advantage that the addition can be made at a uniform rate.

A desirable characteristic of the invention is that the wax and liquid hydrocarbon which make up the continuous solid phase of the Bingham fluid compositions are essentially inert and have no adverse effect on the polymers to which they are added. The liquid hydrocarbon, and frequently the wax, can be vented in passing the mixture through a vented extruder. The wax is either innocuous or has a beneficial effect on many thermoplastic polymers into which it is incorporated. With such systems, the wax can be left in the final compounded polymer.

The process of the invention can be used to incorporate additives into virtually any type of thermoplastic polymer into which additives conventionally are incorporated. Typical examples included both low density and high density ethylene polymers, propylene polymers, styrene polymers and the like. The Bingham fluid compositions and the polymer are suitably mixed and comalaxated in an extruder (preferably vented to remove the liquid hydrocarbon), a Banbury mixer, or like apparatus. The method of the invention offers significant operational advantages in that the Bingham fluid composition can contain a low concentration of the desired additive. Thus, by using a relatively large quantity of the Bingham fluid composition, it is possible to obtain a more uniform blend of the additive and the polymer.

In a preferred embodiment of the invention, the polymer is fed to an extruder or like mixing apparatus such as a Farrel continuous mixer and the Bingham fluid composition is pumped into the melted polymer at a continuous preselected rate. The invention has particular advantages in incorporating additives into low density ethylene polymers which are discharged from a polymerization reactor in a molten state. The Bingham fluid composition can be pumped into the molten polymer either as, or immediately after, the molten polymer is discharged from the polymerization zone. As used herein and in the appended claims, the term "immediately after" means at any downstream processing point before the molten polymer is cooled and solidified.

The Bingham fluid compositions employed in the invention are preferably prepared by heating the desired proportions of wax and the liquid hydrocarbon in a stirred vessel and adding the additive thereto. This mixture is agitated with sufficient intensity to disperse the additive uniformly throughout the melt, after which the entire composition is cooled until it solidifies. The solidified mixture then is transferred to a suitable storage vessel.

FIG. 1 illustrates apparatus for preparing a suitable Bingham fluid composition and injecting it into a molten low density ethylene polymer as it is discharged from a high pressure autoclave polymerization reactor. The apparatus includes a reactor 10 provided with a stirrer 12 driven by a motor 14. The reactor 10 is constructed so that it can operate under an applied pressure of at least about 100 psig. Lines 16, 18, and 20 are provided to feed to the reactor, respectively, a liquid hydrocarbon, a wax, and an additive which is to be the dispersed phase in the final Bingham fluid composition. A gas line 22 fitted with a two-way valve 24 is provided so that the reactor 10 can be pressurized to discharge the Bingham fluid composition from reactor 10 via outlet line 21, which contains a valve 19. Line 21 is connected to storage vessel 30. A two-way valve 28 is provided in line 21 so that the Bingham fluid composition from reactor 10 also can be fed through line 34 to a second storage vessel 36 which is maintained in parallel with storage vessel 30. A transfer line 32 equipped with a valve 33 is provided in storage tank 30 so that the Bingham fluid composition contained therein can be transferred therefrom by means of gear pump 42. In a like manner, an outlet line 38 equipped with a valve 40 is provided in storage tank 36 for feeding the Bingham fluid composition through line 32 to gear pump 42.

In the preparation of the Bingham fluid composition, a melted wax is introduced into reactor 10 through line 16. Liquid hydrocarbon is fed to reactor 10 through line 18. The wax and the liquid hydrocarbon are maintained at a temperature sufficiently high to keep the mixture liquid and are stirred to provide a homogeneous liquid phase. The desired additive then is fed to reactor 10 via line 20. Stirring is continued to thoroughly disperse the additive in the continuous liquid phase. The contents of the reactor 10 then are cooled to the point at which the total composition is just above the gel point. The lines 16, 18, and 20 then are sealed by suitable valves not shown and the reactor is pressurized by an inert gas introduced into the reactor via line 22. Valves 19 and 28 are opened and the Bingham fluid composition in reactor 10 is transferred via line 21 to storage tank 30.

To assure that an adequate supply of Bingham fluid composition is available at all times, the operations above-described are repeated with the exception that valve 28 is turned so that the Bingham fluid composition prepared in reactor 10 is transferred to the second storage tank 36.

With the storage tanks 30 and 36 filled with the desired Bingham fluid composition, the apparatus is in a condition to feed the Bingham fluid composition into molten ethylene polymer being discharged from polymerization reactor 50. Valve 19 is closed and valves 24 and 28 are set so that gas from line 22 is fed through line 26 into line 21 so as to apply a pressure on the contents of storage tank 30. The pressure applied on storage tank 30 converts the Bingham fluid composition to the liquid phase and forces the composition through line 32 and valve 33 to gear pump 42 which feeds the composition through line 44 to output line 56 of polymerization reactor 50. Polymerization reactor 50 is a high pressure stirred autoclave which typically will operate at pressures in excess of 1,000 atmospheres and at temperatures in excess of 200° C. Polymerization grade ethylene is fed to reactor 50 from compressor 52 via line 54. A polymerization initiator will be fed to reactor 50 by suitable means not shown. Product is continuously discharged from reactor 50 via line 56 and valve 58, and typically will contain 10-15 weight % ethylene polymer and the balance unconverted ethylene. The Bingham fluid composition entering line 56 via line 44 is intimately dispersed in the hot molten ethylene polymer. Line 56 discharges into a high pressure separator 60 which typically operates at a pressure of about 200 atmospheres and a temperature of about 230° C. Unpolymerized ethylene, the wax component of the Bingham fluid, and the liquid hydrocarbon component of the Bingham fluid are discharged via line 62 for recovery and/or recycling. The molten ethylene polymer and the additive component of the Bingham fluid are transferred via line 64 to a low pressure separator 66 which typically operates at a pressure of about 10 atmospheres and at a temperature of about 200° C. Any residual volatile products are recovered via line 68 and the molten polymer containing the additive is discharged via line 70 to an extruder 72.

In the drawing, the Bingham fluid composition is fed into the molten ethylene polymer at a point intermediate of the reactor and the high pressure separator. If desired, the Bingham fluid can be introduced into the molten polymer downstream from either the high pressure separator or the low pressure separator, or in the extruder 72.

To prepare Bingham fluid compositions containing a normally gaseous hydrocarbon such as ethylene as the liquid hydrocarbon component of the Bingham fluid compositions, it is necessary to operate at reduced temperature and elevated pressures. The reactor 10 is charged with a hydrocarbon such as tetradecane (which will function as the equivalent of the wax) and the additive. The mixture is well stirred and ethylene is admitted to reactor 10 at a pressure well in excess of 50.5 atmospheres. Reactor 10 then is cooled to a temperature well below 9.9° C. to liquify the ethylene. As the composition in reactor 10 is about to solidify, valves 19 and 28 are opened to transfer the Bingham fluid composition to storage vessel 30 which will be maintained well below 9.9° C. Valve 19 is closed and valves 24 and 28 are adjusted so that storage vessel 30 is maintained under an ethylene pressure in excess of 50.5 atmospheres. When valve 33 is opened, the Bingham fluid composition will flow through line 32 to gear pump 42. Line 32, valve 33, gear pump 42, and line 44 will be maintained at a temperature below 9.9° C.

Figure 2:
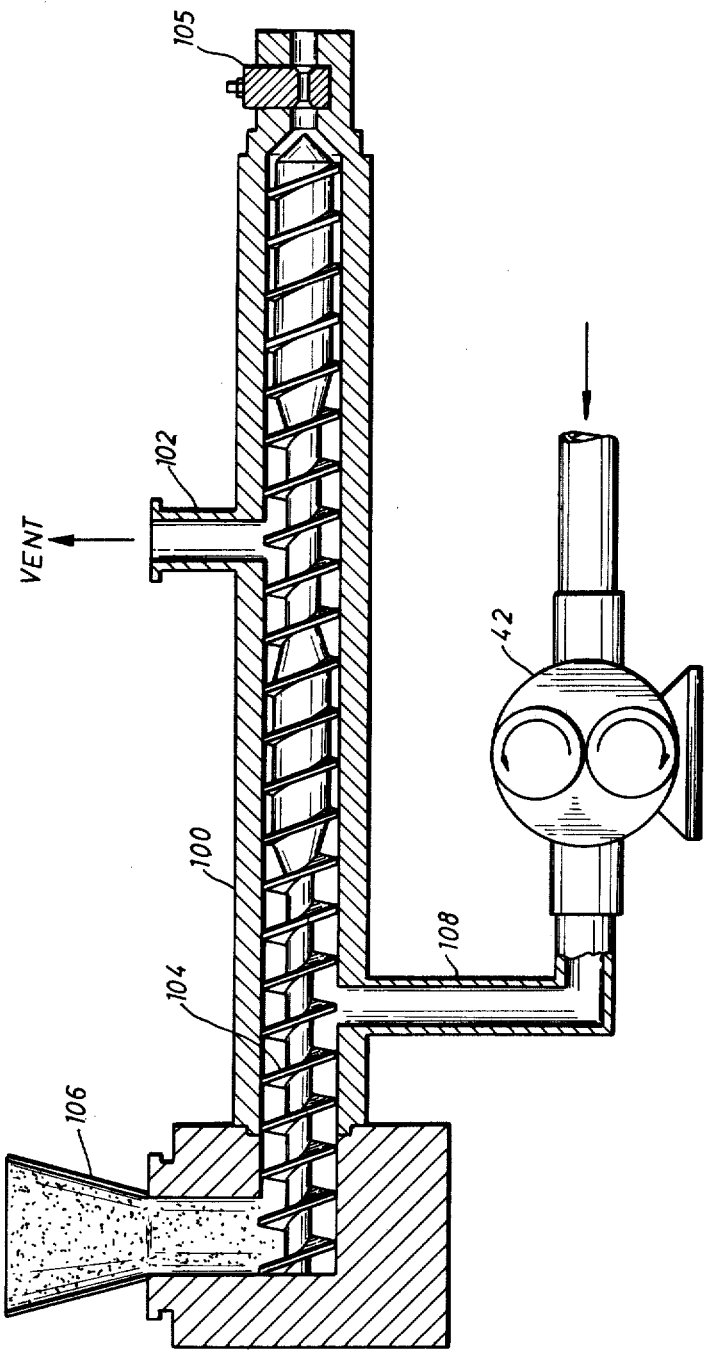
FIG. 2 is a schematic representation of another form of apparatus for carrying out the process of the invention.

FIG. 2 illustrates apparatus for incorporating a functional additive into a thermoplastic polymer which initially is prepared and recovered in particulate form. A typical polymer of this type is a high density ethylene polymer prepared in a particle form reactor. The apparatus is a modified two-zone vented compounding extruder which includes a barrel 100, a vent 102 in the barrel, a screw 104, an adjustable discharge valve 105, and a feed hopper 106. As will be recognized by those skilled in the art, screw 104 is constructed to provide in the extruder, as viewed from left to right in the drawing, a plasticizing (melting) section, a metering (pumping) section, a decompression (venting) section, and a second metering (pumping) section. A line 108 fed by gear pump 42 is provided to feed the Bingham fluid composition into the molten polymer in the plasticizing (melting) section of the extruder. Conventional extruder components not essential to an understanding of the operability of the invention are not shown. Such components include, inter alia, a drive mechanism, heating and/or cooling means, filter screens, and the like.

In operation, the polymer is continuously fed to the extruder at a uniform rate from hopper 106. As the resin is advanced and melted, a Bingham fluid composition containing the desired additive(s) is pumped by gear pump 42 via line 108 into the extruder at a uniform rate. With most systems of interest, the pressure in line 108 will be higher than the pressure in the plasticizing (melting) section of the extruder. Consequently, molten polymer does not flow into line 108. If desired, however, a one-way valve can be included at the exit port of line 108. As the mass of polymer and Bingham fluid composition moves through the extruder, the additive is dispersed throughout the polymer. When the molten polymer passes through the decompression (venting) section, the liquid hydrocarbon of the Bingham fluid composition will be vented from the polymer via line 102. By applying a vacuum to line 102, the petroleum wax also can be vented. The polymer discharged through discharge valve 105 will have the additive uniformly dispersed throughout the polymer.

The following examples are set forth to illustrate more clearly the principle and practice of this invention to those skilled in the art. When parts and percentages are mentioned, they are parts and percentages by weight unless otherwise specifically noted.

EXAMPLE 1

Part A

A paraffin* wax having a melting point of 54°–56° C., in the amount of 716 gms, was melted and charged to reactor 10 which had a 3-liter capacity. The melted wax was cooled to a temperature of about 65° C. and 500 ml of n-heptane was charged to the reactor. The contents of the reactor were cooled to about 55° C. and 100 gms of finely-divided diatomaceous earth slurried in 200 ml of n-heptane was charged to the reactor. Stirring was continued until the temperature was reduced to 40° C., at which point incipient solidification of the composition began to take place. Valves 19 and 28 were opened and a nitrogen pressure of 50 psig was introduced into reactor 10 by line 22 to transfer the contents of reactor 10 to storage tank 30.

*The wax was a synthetic paraffin prepared by hydrogenating a mixture of synthesized mono-1-olefins containing about 30 carbon atoms.

Part B

The Bingham fluid composition of Part A was fed to molten ethylene polymer being discharged from an autoclave reactor at a rate such that the recovered ethylene polymer contained about 0.01 weight % diatomaceous earth. Film prepared from this polymer composition had antiblock properties comparable to those obtained when film is prepared from similar polymer compositions in which the diatomaceous earth is dispersed into the ethylene polymer in a compounding extruder.

EXAMPLE 2

Part A

A Bingham fluid composition suitable for use in injecting a total additive package into a film grade low density ethylene polymer was prepared from 750 ml of hexane, 95 grams of the paraffin wax described in Example 1, 190 grams of diatomaceous earth, 450 grams of erucamide, and 380 grams of an antioxidant. In this composition, the weight ratio of hexane to petroleum wax was about 5.2:1.0. A lower than normal quantity of paraffin wax was used as the composition contained a large quantity of diatomaceous earth which served as a partial functional replacement for the paraffin wax.

Part B

The Bingham fluid composition of Part A was fed to molten ethylene polymer being discharged from an autoclave reactor at a rate such that the recovered ethylene polymer contained about 0.01 weight % diatomaceous earth, about 0.02 weight % of the antioxidant, and about 0.024 weight % of erucamide. Film prepared from this polymer composition had properties comparable to those obtained when film is prepared from similar polymer compositions in which the additive package is dispersed into the ethylene polymer in a compounding extruder.

In this composition, the weight ratio of hexane to petroleum wax was about 5.2:1.0. A lower than normal quantity of paraffin wax was used as the composition contained a large quantity of diatomaceous earth which served as a partial functional replacement for the paraffin wax.

What is claimed is:

1. In a process in which an additive is incorporated into and dispersed in a thermoplastic polymer by comalaxation at a temperature above the softening temperature of the polymer; the improvement which consists essentially of admixing with said thermoplastic polymer a Bingham fluid composition and comalaxating said mixture, said Bingham fluid composition being a solid at ambient temperature and capable of flow under an applied pressure and consisting essentially of:

(a) a continuous solid phase consisting essentially of an intimate mixture of a wax and a liquid hydrocarbon, and (b) at least one additive capable of modifying a solid polymer uniformly dispersed throughout the continuous solid phase of (a);

the wax employed in the continuous solid phase of the Bingham fluid composition being characterized in that:

(c) at least 30 parts of the wax will dissolve in 100 parts of n-heptane at 80° C., (d) a solution prepared per (d), when cooled to 20° C., forms a continuous solid phase, and (e) the continuous phase prepared per (e) will flow when subjected to a shear stress of 50 sec$^{-1}$.

2. A process of claim 1 in the continuous solid phase of (a) consists essentially of 100 parts by weight of a hydrocarbon wax and about 40 to 250 parts by weight of the liquid hydrocarbon.

3. A process of claim 1 or 2 in which the thermoplastic polymer is passed through an extruder and the Bingham fluid composition is pumped into the melted polymer in said extruder.

4. A process of claim 1, or 2, in which the thermoplastic polymer is selected from the group consisting of ethylene and propylene polymers.

5. A process of claim 1 or 2, in which at least one of the additives is a finely-divided solid inorganic material.

6. A process for dispersing an additive into an ethylene polymer which consists essentially of pumping a Bingham fluid composition into a mass of molten ethylene polymer, either as, or immediately after, the molten ethylene polymer is discharged from the polymerization zone in which it was prepared, said Bingham fluid composition being a solid at ambient temperature and capable of flow under an applied pressure, and consisting essentially of an additive uniformly dispersed in a continuous solid phase which consists essentially of an intimate mixture of a wax which is a solid at ambient temperature and a hydrocarbon which is a liquid at ambient temperature; the wax employed in the continuous solid phase of the Bingham fluid composition being characterized in that:

(a) at least 30 parts of the wax will dissolve in 100 parts of n-heptane at 80° C., (b) a solution prepared per (a), when cooled to 20° C., forms a continuous solid phase, and (c) the continuous phase prepared per (b) will flow when subjected to a shear stress of 50 sec$^{-1}$.

7. A process of claim 6 in which the Bingham fluid is pumped into the molten polymer immediately after the polymer has been discharged from the reaction zone in which it was polymerized.

8. A process of claim 6 in which at least one of the additives is a finely-divided inorganic material.

9. A process of claim 8 in which the inorganic material consists predominately of silica.

10. A process of claim 8 in which the inorganic material is diatomaceous earth.

11. A process of claim 8 in which the inorganic material is carbon black.

12. A process of claim 6, 7, 8, 9, 10, or 11 in which the continuous solid phase of the Bingham fluid composition consists essentially of 100 parts by weight of a hydrocarbon wax and about 40 to 250 parts by weight of liquid hydrocarbon.

13. A process for dispersing an additive into an ethylene polymer which consists essentially of pumping a Bingham fluid composition into a mass of molten ethylene polymer, either as, or immediately after, the molten ethylene polymer is discharged from the polymerization zone in which it was prepared, said Bingham fluid composition being a solid at subambient temperature and capable of flow under an applied pressure, and consisting essentially of an additive uniformly dispersed in a continuous solid phase which consists essentially of an intimate mixture of a $C_{10}$ to $C_{15}$ aliphatic hydrocarbon and ethylene, said Bingham fluid composition being maintained at a temperature below 9.9° C. and under an ethylene pressure in excess of 50.5 atmospheres.

14. A process of claim 13 in which at least one of the additives is a finely-divided inorganic material.

15. A process for dispersing an additive into a styrene polymer which consists essentially of pumping a Bingham fluid composition into a mass of molten styrene polymer, either as, or immediately after, the molten styrene polymer is discharged from the polymerization zone in which it was prepared, said Bingham fluid composition being a solid at ambient temperature and capable of flow under an applied pressure, and consisting essentially of an additive uniformly dispersed in a continuous solid phase which consists essentially of an intimate mixture of a wax which is a solid at ambient temperature and a hydrocarbon which is a liquid at ambient temperature; the wax employed in the continuous solid phase of the Bingham fluid composition being characterized in that:

(a) at least 30 parts of the wax will dissolve in 100 parts of n-heptane at 80° C., (b) a solution prepared per (a), when cooled to 20° C., forms a continuous solid phase, and (c) the continuous phase prepared per (b) will flow when subjected to a shear stress of 50 sec$^{-1}$.

16. A process of claim 15 in which the continuous solid phase of the Bingham fluid composition consists essentially of 100 parts by weight of hydrocarbon wax and about 40 to 250 parts by weight of liquid hydrocarbon.

* * * * *